United States Patent
Natanzon et al.

(10) Patent No.: US 9,244,997 B1
(45) Date of Patent: Jan. 26, 2016

(54) ASYMMETRIC ACTIVE-ACTIVE ACCESS OF ASYNCHRONOUSLY-PROTECTED DATA STORAGE

(71) Applicant: EMC Corporation, Hopkinton, MA (US)

(72) Inventors: Assaf Natanzon, Tel Aviv (IL); Steven Bromling, Edmonton (CA); Bradford B. Glade, Harvard, MA (US); Saar Cohen, Moshav Mishmeret (IL)

(73) Assignee: EMC Corporation, Hopkinton, MA (US)

( * ) Notice: Subject to any disclaimer, the term of this patent is extended or adjusted under 35 U.S.C. 154(b) by 180 days.

(21) Appl. No.: 13/835,999

(22) Filed: Mar. 15, 2013

(51) Int. Cl.
*G06F 17/00* (2006.01)
*G06F 11/20* (2006.01)
*G06F 17/30* (2006.01)

(52) U.S. Cl.
CPC ...... *G06F 17/30578* (2013.01); *G06F 11/2058* (2013.01)

(58) Field of Classification Search
CPC ............. G06F 11/2058; G06F 17/30578
USPC ............ 707/613, 620, 823, 658; 709/223
See application file for complete search history.

(56) References Cited

U.S. PATENT DOCUMENTS

| | | |
|---|---|---|
| 5,170,480 A | 12/1992 | Mohan et al. |
| 5,388,254 A | 2/1995 | Betz et al. |
| 5,499,367 A | 3/1996 | Bamford et al. |
| 5,864,837 A | 1/1999 | Maimone |
| 5,879,459 A | 3/1999 | Gadgil et al. |
| 5,990,899 A | 11/1999 | Whitten |
| 6,042,652 A | 3/2000 | Hyun et al. |
| 6,065,018 A | 5/2000 | Beier et al. |
| 6,143,659 A | 11/2000 | Leem |
| 6,148,340 A | 11/2000 | Bittinger et al. |
| 6,174,377 B1 | 1/2001 | Doering et al. |
| 6,174,809 B1 | 1/2001 | Kang et al. |
| 6,203,613 B1 | 3/2001 | Gates et al. |
| 6,260,125 B1 | 7/2001 | McDowell |
| 6,270,572 B1 | 8/2001 | Kim et al. |
| 6,272,534 B1 | 8/2001 | Guha |
| 6,287,965 B1 | 9/2001 | Kang et al. |
| 6,467,023 B1 | 10/2002 | DeKoning et al. |
| 6,574,657 B1 | 6/2003 | Dickinson |
| 6,621,493 B1 | 9/2003 | Whitten |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

Microsoft Computer Dictionary, 2002 Press Fifth Edition, p. 58.

(Continued)

*Primary Examiner* — Marc Filipczyk
(74) *Attorney, Agent, or Firm* — Daly, Crowley, Mofford & Durkee, LLP

(57) ABSTRACT

In one aspect, a method to provide asymmetric active-active access to a first storage volume using a global cache coupled to a first and second virtual storage volumes includes replicating asynchronously the first storage volume at a first site to a second storage volume at a second site, virtualizing the first storage volume with the first virtual storage volume; and virtualizing the second storage volume with the second virtual storage volume. The first storage volume has primary storage functionality.

28 Claims, 7 Drawing Sheets

(56) References Cited

U.S. PATENT DOCUMENTS

| | | |
|---|---|---|
| 6,804,676 B1 | 10/2004 | Bains, II |
| 6,947,981 B2 | 9/2005 | Lubbers et al. |
| 7,043,610 B2 | 5/2006 | Horn et al. |
| 7,076,620 B2 | 7/2006 | Takeda et al. |
| 7,111,197 B2 | 9/2006 | Kingsbury et al. |
| 7,117,327 B2 | 10/2006 | Hirakawa et al. |
| 7,120,768 B2 | 10/2006 | Mizuno et al. |
| 7,130,975 B2 | 10/2006 | Suishu et al. |
| 7,139,927 B2 | 11/2006 | Park et al. |
| 7,146,439 B1 | 12/2006 | Ofer et al. |
| 7,159,088 B2 | 1/2007 | Hirakawa et al. |
| 7,167,963 B2 | 1/2007 | Hirakawa et al. |
| 7,203,741 B2 | 4/2007 | Marco et al. |
| 7,222,136 B1 | 5/2007 | Brown et al. |
| 7,240,238 B2 * | 7/2007 | Yanai .................. G06F 3/0601 714/6.32 |
| 7,280,536 B2 * | 10/2007 | Testardi ............... G06F 3/0611 370/353 |
| 7,296,008 B2 | 11/2007 | Passerini et al. |
| 7,328,737 B2 | 2/2008 | Kawamura et al. |
| 7,360,113 B2 | 4/2008 | Anderson et al. |
| 7,426,618 B2 | 9/2008 | Vu et al. |
| 7,516,287 B2 | 4/2009 | Ahal et al. |
| 7,519,625 B2 | 4/2009 | Honami et al. |
| 7,519,628 B1 | 4/2009 | Leverett |
| 7,546,485 B2 | 6/2009 | Cochran et al. |
| 7,577,867 B2 | 8/2009 | Lewin et al. |
| 7,606,940 B2 | 10/2009 | Yamagami |
| 7,627,612 B2 | 12/2009 | Ahal et al. |
| 7,627,687 B2 | 12/2009 | Ahal et al. |
| 7,719,443 B1 | 5/2010 | Natanzon |
| 7,757,057 B2 | 7/2010 | Sangapu et al. |
| 7,769,931 B1 | 8/2010 | Angelone et al. |
| 7,774,565 B2 | 8/2010 | Lewin et al. |
| 7,797,358 B1 | 9/2010 | Ahal et al. |
| 7,840,536 B1 | 11/2010 | Ahal et al. |
| 7,840,662 B1 | 11/2010 | Natanzon |
| 7,844,856 B1 | 11/2010 | Ahal et al. |
| 7,849,361 B2 | 12/2010 | Ahal et al. |
| 7,860,836 B1 | 12/2010 | Natanzon et al. |
| 7,882,286 B1 | 2/2011 | Natanzon et al. |
| 7,904,681 B1 | 3/2011 | Bappe et al. |
| 7,908,515 B1 | 3/2011 | Schechner et al. |
| 7,934,262 B1 | 4/2011 | Natanzon et al. |
| 7,945,640 B1 | 5/2011 | Van Tine |
| 7,958,372 B1 | 6/2011 | Natanzon |
| 7,962,567 B1 | 6/2011 | Sandstrom et al. |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,095,577 B1 * | 1/2012 | Faibish ............. G06F 17/30091 707/823 |
| 8,103,937 B1 | 1/2012 | Natanzon et al. |
| 8,108,634 B1 | 1/2012 | Natanzon et al. |
| 8,140,821 B1 | 3/2012 | Raizen et al. |
| 8,150,936 B2 | 4/2012 | Liu et al. |
| 8,166,314 B1 | 4/2012 | Raizen et al. |
| 8,205,009 B2 | 6/2012 | Heller et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,838,931 B1 * | 9/2014 | Marshak ............... G06F 3/0605 710/74 |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 2002/0129168 A1 | 9/2002 | Kanai et al. |
| 2003/0061537 A1 | 3/2003 | Cha et al. |

(56) References Cited

U.S. PATENT DOCUMENTS

| | | |
|---|---|---|
| 2003/0110278 A1 | 6/2003 | Anderson |
| 2003/0196147 A1 | 10/2003 | Hirata et al. |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0172092 A1 | 8/2005 | Lam et al. |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa et al. |
| 2006/0117211 A1 | 6/2006 | Matsunami et al. |
| 2006/0161810 A1 | 7/2006 | Bao |
| 2006/0195670 A1 | 8/2006 | Iwamura et al. |
| 2006/0212462 A1 | 9/2006 | Heller et al. |
| 2007/0055833 A1 | 3/2007 | Vu et al. |
| 2007/0180304 A1 | 8/2007 | Kano |
| 2007/0198602 A1 | 8/2007 | Ngo et al. |
| 2007/0198791 A1 | 8/2007 | Iwamura et al. |
| 2007/0266053 A1 | 11/2007 | Ahal et al. |
| 2008/0082592 A1 | 4/2008 | Ahal et al. |

OTHER PUBLICATIONS

Sous et al.; "Metadata Efficiency in a Comprehensive Versioning File System", May 2002, CMU-CS-02-145, School of Computer Science, Carnegie Mellon University, Pittsburgh, PA 15213, 33 pages.

Office Action dated Dec. 21, 2011, U.S. Appl. No. 12/045946, 14 pages.

Office Action dated Jan. 23, 2012, U.S. Appl. No. 12/818,238, 17 Pages.

Soules. Metadate Efficiency in Versioning File Systems, 2003, pp. 1-16.

AIX System Management Concepts: Operating Systems and Devices May 2000, pp. 1-280.

Office Action dated Mar. 31, 2009 for U.S. Appl. No. 11/609,560, 15 pages.

Response to Office Action tried Jun. 10, 2089 in U.S. Appl. No. 11/609,560, 18 pages.

Office Action dated Oct. 21, 2009 for U.S. Appl. No. 11/609,560, 34 pages.

Response to Office Action filed on Jan. 14, 2010 in U.S. Appl. No. 11/609,560, 16 pages.

Notice of Allowance dated Sep. 27, 2011 for U.S. Appl. No. 11/609,560, 13 pages.

Office Action dated Aug. 17, 2011 for U.S. Appl. No. 12/057,652, 19 pages.

Response to Office Action filed on Sep. 1, 2011 in U.S. Appl. No. 12/057,652, 9 pages.

Notice of Allowance dated Sep. 27, 2011 for U.S. Appl. No. 12/057,652, 8 pages.

Office Action dated Jun. 11, 2009 for U.S. Appl. No. 11/609,561 7 pages.

Response to Office Action filed on Sep. 16, 2009 in U.S. Appl. No. 11/609,561 12 pages.

Office Action dated Jan. 11, 2010 for U.S. Appl. No. 11/609,561 10 pages.

Pre-Appeal Brief Request for Review filed Mar. 25, 2010 in U.S. Appl. No. 11/609,561 6 pages.

Notice of Panel Decision from Pre-Appreal Brief Review dated Jul. 16, 2010 in U.S. Appl. No. 11/609,561 2 pages.

Notice of Allowance dated Sep. 14, 2010 in U.S. Appl. No. 11/609,561, 7 pages.

Office Action dated Sep. 30, 2008 in U.S. Appl. No. 11/356,920, 34 pages.

Response to Office Action filed Dec. 19, 2008 in U.S. Appl. No. 11/356,920, 23 pages.

Notice of Allowance dated Apr. 20, 2009 in U.S. Appl. No. 11/356,920, 10 pages.

Office Action dated Dec. 12, 2007, in U.S. Appl. No. 10/512,687, 20 pages.

Response to Office Action filed on Jun. 9, 2008 in U.S. Appl. No. 10/512,687, 14 pages.

Office Action dated Sep. 10, 2008 in U.S. Appl. No. 10/512,687, 16 pages.

Response to Office Action filed on Dec. 9, 2008 in U.S. Appl. No. 10/512,687, 13 pages.

Advisory Action dated Jan. 7, 2009 in U.S. Appl. No. 10/512,687, 3 pages.

Response to Office Action filed on Feb. 10, 2009 in U.S. Appl. No. 10/512,687, 23 pages.

Office Action dated Apr. 3, 2009 in U.S. Appl. No. 10/512,687, 16 pages.

Response to Office Action filed on Jul. 28, 2009 in U.S. Appl. No. 10/512,687, 18 pages.

Office Action dated Nov. 18, 2009 in U.S. Appl. No. 10/512,687, 20 pages.

Response to Office Action filed on Mar. 15, 2013 in U.S. Appl. No. 10/512,687, 19 pages.

Office Action dated Oct. 20, 2011 in U.S. Appl. No. 10/512,687, 28 pages.

Response to Office Action filed on Jan. 10, 2012 in U.S. Appl. No. 10/512,687, 14 pages.

Notice of Allowance dated Apr. 27, 2012 in U.S. Appl. No. 10/512,687, 7 pages.

Office Action dated Sep. 23, 2008 in U.S. Appl. No. 11/536,215, 8 pages.

Response to Office Action filed on Nov. 19, 2008 in U.S. Appl. No. 11/536,215, 10 pages.

Notice of Allowance dated Dec. 10, 2008 in U.S. Appl. No. 11/536,215, 9 pages.

Office Acton dated Aug. 19, 2008 in U.S. Appl. No. 11/536,233, 8 pages.

Response to Office Action filed on Sep. 17, 2008 in U.S. Appl. No. 11/536,233, 9 pages.

Office Action dated Oct. 27, 2008 in U.S. Appl. No. 11/536,233, 5 pages.

Response to Office Action filed on Nov. 25, 2008 in U.S. Appl. No. 11/536,233, 11 pages.

Office Action dated Mar. 6, 2009 in U.S. Appl. No. 11/536,233, 29 pages.

Response to Office Action filed on Jun. 3, 2009 in U.S. Appl. No. 11/536,233, 16 pages.

Notice of Allowance dated Sep. 16, 2009 in U.S. Appl. No. 11/536,233, 3 pages.

Office Action dated Apr. 23, 2009 in U.S. Appl. No. 11/536,160, 21 pages.

Response to Ofice Action filed on Jun. 9, 2009 in U.S. Appl. No. 11/523,160, 12 pages.

Notice of Allowance dated Aug. 31, 2009 in U.S. Appl. No. 11/536,160, 19 pages.

Office Action dated Mar. 25, 2010 in U.S. Appl. No. 11/964,168, 17 pages.

Response to Office Action filed on Apr. 13, 2010 in U.S. Appl. No. 11/964,168, 10 pages.

Notice of Allowance dated Jul. 8, 2010 in U.S. Appl. No. 11/964,168, 8 pages.

\* cited by examiner

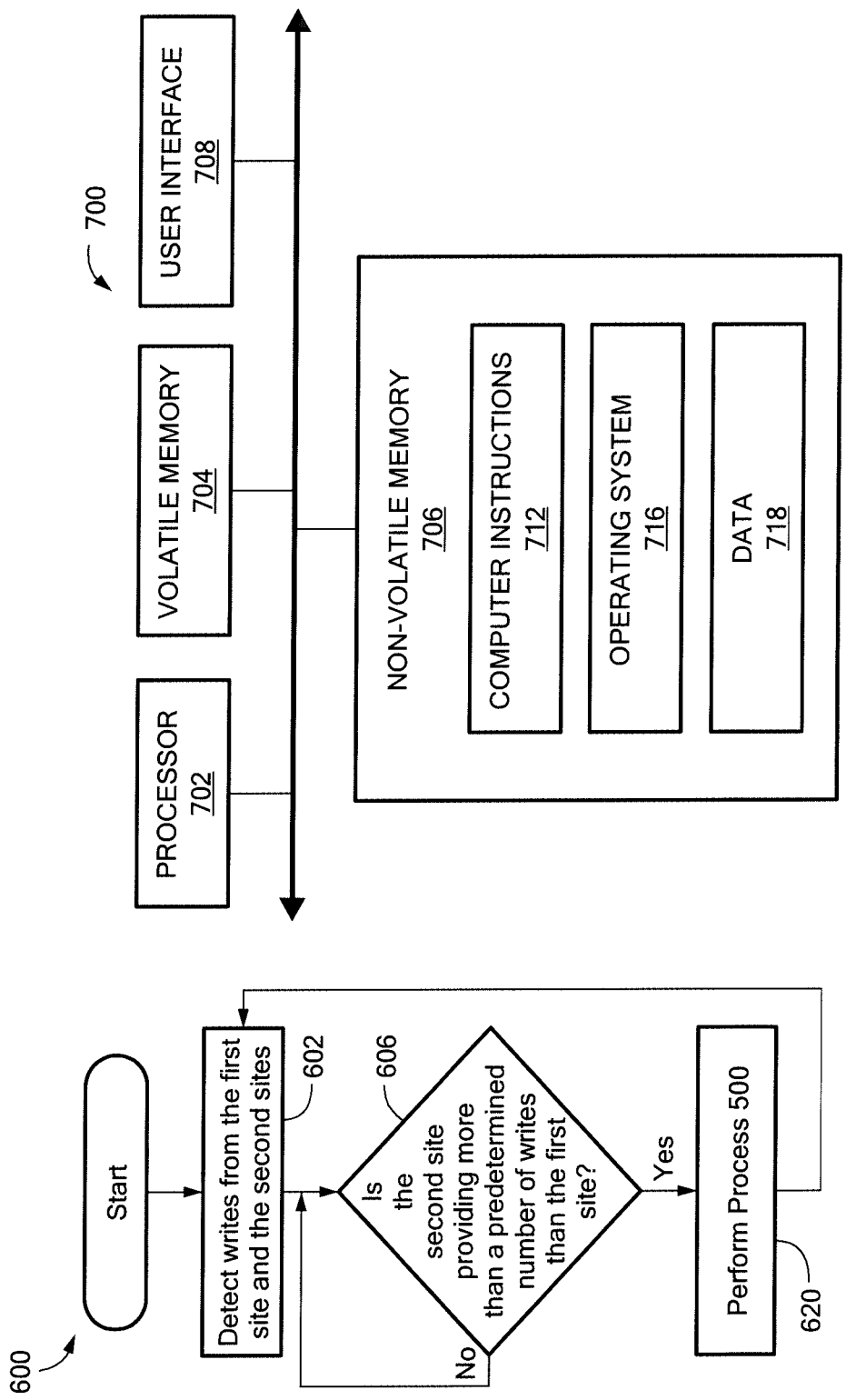

ASYMMETRIC ACTIVE-ACTIVE ACCESS OF ASYNCHRONOUSLY-PROTECTED DATA STORAGE

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method to provide asymmetric active-active access to a first storage volume using a global cache coupled to a first and second virtual storage volumes includes replicating asynchronously the first storage volume at a first site to a second storage volume at a second site, virtualizing the first storage volume with the first virtual storage volume; and virtualizing the second storage volume with the second virtual storage volume. The first storage volume has primary storage functionality.

In another aspect, an apparatus includes electronic hardware circuitry to provide asymmetric active-active access to a first storage volume using a global cache coupled to a first and second virtual storage volumes. The circuitry is configured to replicate asynchronously the first storage volume at a first site to a second storage volume at a second site, virtualize the first storage volume with the first virtual storage volume and virtualize the second storage volume with the second virtual storage volume. The first storage volume has primary storage functionality.

In a further aspect, an article includes a non-transitory computer-readable medium that stores computer-executable instructions to provide asymmetric active-active access to a first storage volume using a global cache coupled to a first and second virtual storage volumes. The instructions causing a machine to replicate asynchronously the first storage volume at a first site to a second storage volume at a second site, virtualize the first storage volume with the first virtual storage volume and virtualize the second storage volume with the second virtual storage volume. The first storage volume has primary storage functionality.

BRIEF DESCRIPTION OF THE DRAWINGS

FIG. 6 is a flowchart of an example of a process to automatically (without user intervention) transfer primary storage functionality from one site to another site.

FIG. 7 is a computer on which any of the processes of FIGS. 4A to 4C, 5 and 6 may be implemented.

DETAILED DESCRIPTION

Figure 1:
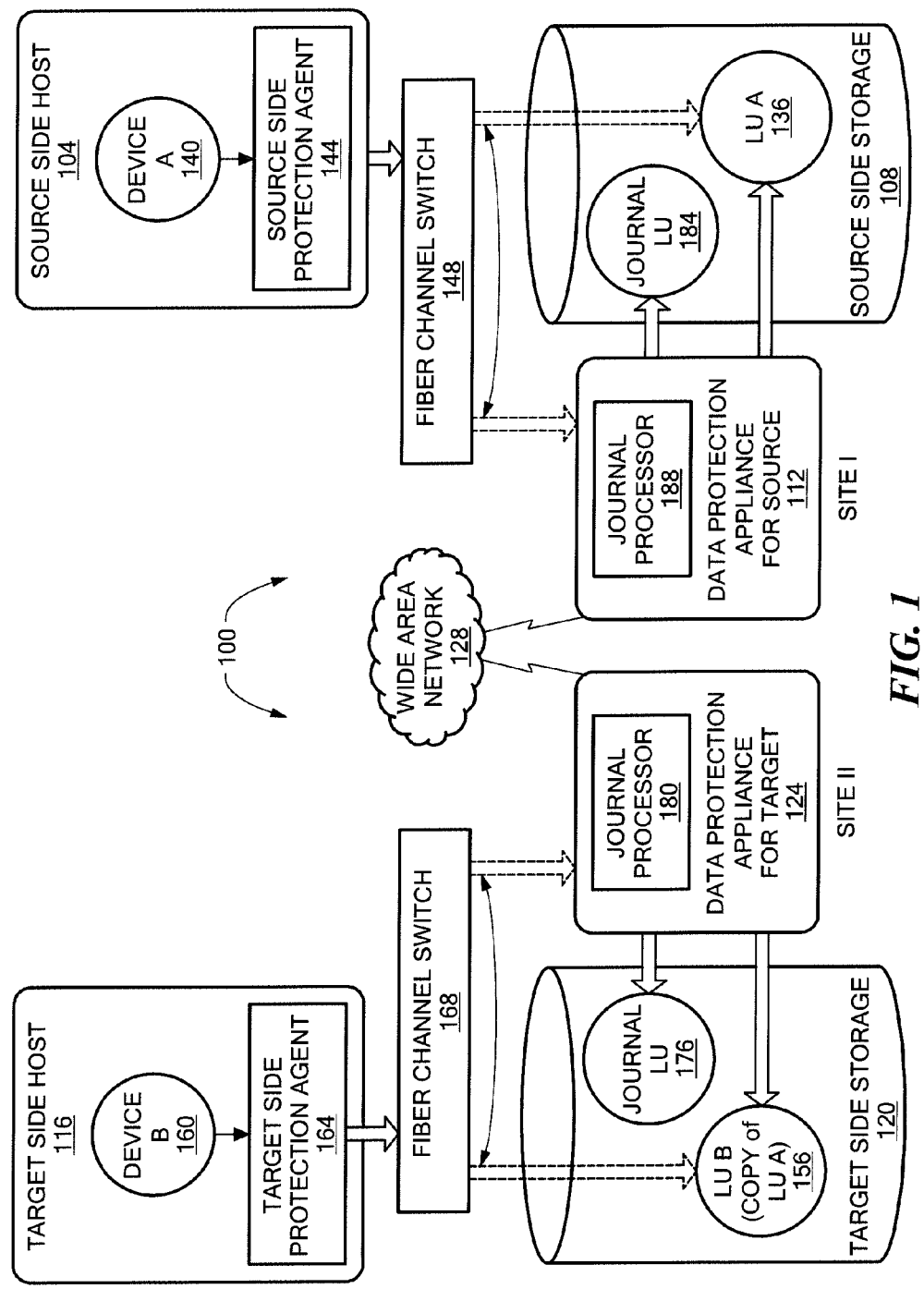
FIG. 1 is a block diagram of an example of a data protection system.

Described herein is an approach to combine a distributed global cache coherence engine with an asynchronous-directional replication system including techniques to overcome lags in the data replication and techniques to transfer primary storage functionality from one site to another site.

The following definitions may be useful in understanding the specification and claims.

BACKUP SITE—a facility where replicated production site data is stored; the backup site may be located in a remote site or at the same location as the production site;

BOOKMARK—a bookmark is metadata information stored in a replication journal which indicates a point in time.

DATA PROTECTION APPLIANCE (DPA)—a computer or a cluster of computers responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

I/O REQUEST—an input/output request (sometimes referred to as an I/O), which may be a read I/O request (sometimes referred to as a read request or a read) or a write I/O request (sometimes referred to as a write request or a write);

JOURNAL—a record of write transactions issued to a storage system; used to maintain a duplicate storage system, and to roll back the duplicate storage system to a previous point in time;

LOGICAL UNIT—a logical entity provided by a storage system for accessing data from the storage system. The logical disk may be a physical logical unit or a virtual logical unit;

LUN—a logical unit number for identifying a logical unit;

PHYSICAL LOGICAL UNIT—a physical entity, such as a disk or an array of disks, for storing data in storage locations that can be accessed by address;

PRODUCTION SITE—a facility where one or more host computers run data processing applications that write data to a storage system and read data from the storage system;

REMOTE ACKNOWLEDGEMENTS—an acknowledgement from remote DPA to the local DPA that data arrived at the remote DPA (either to the appliance or the journal)

SPLITTER ACKNOWLEDGEMENT—an acknowledgement from a DPA to the protection agent (splitter) that data has been received at the DPA; this may be achieved by an SCSI status command.

SAN—a storage area network of nodes that send and receive an I/O and other requests, each node in the network being an initiator or a target, or both an initiator and a target;

SOURCE SIDE—a transmitter of data within a data replication workflow, during normal operation a production site is the source side; and during data recovery a backup site is the source side, sometimes called a primary side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side, sometimes called a secondary side;

VIRTUAL LOGICAL UNIT—a virtual storage entity which is treated as a logical unit by virtual machines;

WAN—a wide area network that connects local networks and enables them to communicate with one another, such as the Internet.

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

Figure 2:
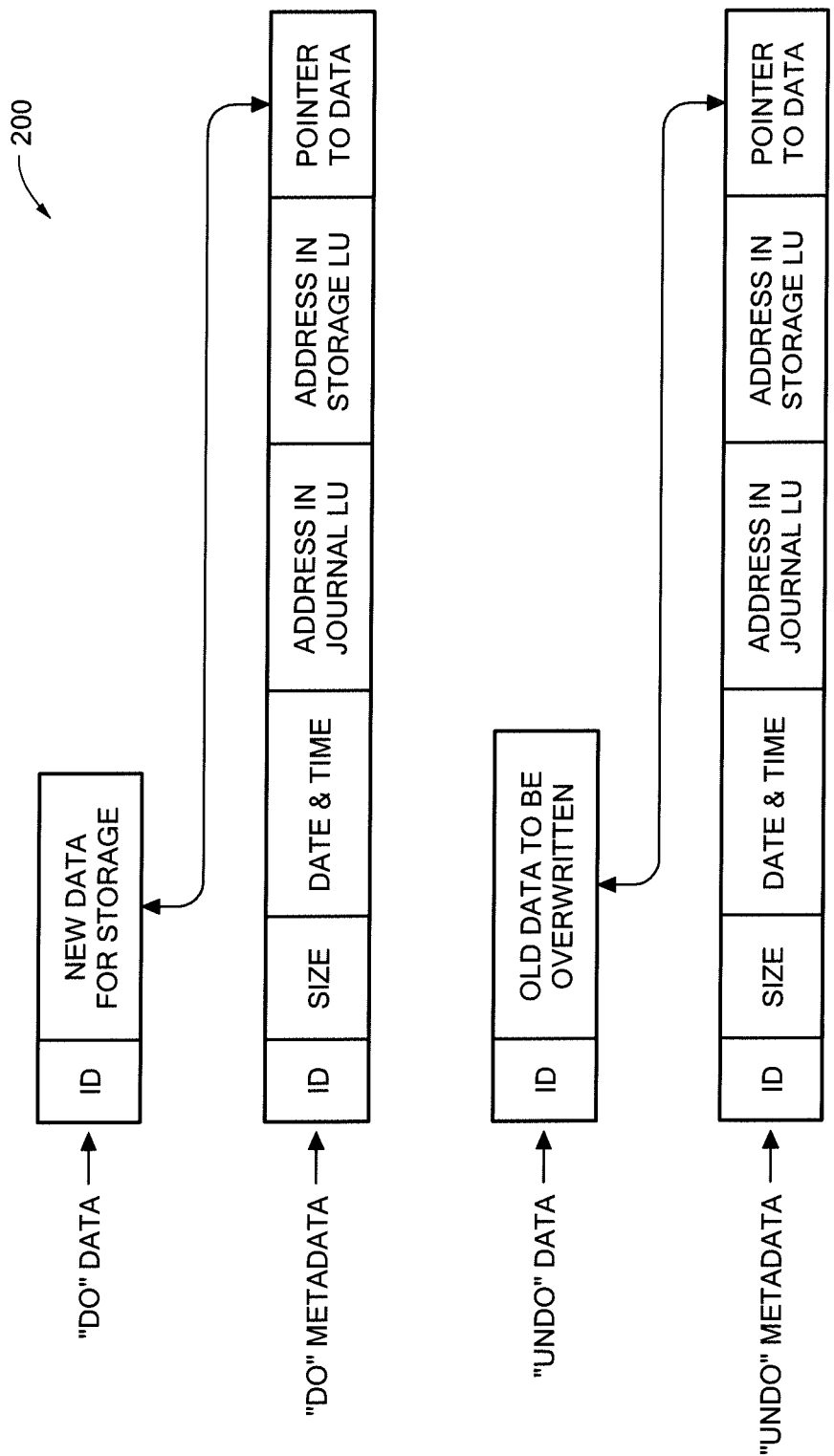
FIG. 2 is an illustration of an example of a journal history of write transactions for a storage system.

Before describing a distributed global cache coherence engine in an asynchronous directional replication system, an example replication system is first described in FIGS. 1 and 2.

An Example of a Replication System

Referring to FIG. 1, a data protection system 100 includes two sites; Site I, which is a production site, and Site II, which is a backup site or replica site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

FIG. 1 is an overview of a system for data replication of either physical or virtual logical units. Thus, one of ordinary skill in the art would appreciate that in a virtual environment a hypervisor, in one example, would consume logical units and generate a distributed file system on them such as VMFS creates files in the file system and expose the files as logical units to the virtual machines (each VMDK is seen as a SCSI device by virtual hosts). In another example, the hypervisor consumes a network based file system and exposes files in the NFS as SCSI devices to virtual hosts.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (sometimes referred to as a splitter) may run on the host, or on the storage, or in the network or at a hypervisor level, and that DPAs are optional and DPA code may run on the storage array too, or the DPA 124 may run as a virtual machine.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. The logical unit may be a physical logical unit or a virtual logical unit. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B. updates the journal entries in the journal LU with undo information, applies the journal transactions to LU B, and removes already-applied transactions from the journal.

Referring to FIG. 2, which is an illustration of a write transaction 200 for a journal. The journal may be used to provide an adaptor for access to storage 120 at the state it was in at any specified point in time. Since the journal contains the "undo" information necessary to roll back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in the journal that includes four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the UNDO stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

Figure 3:
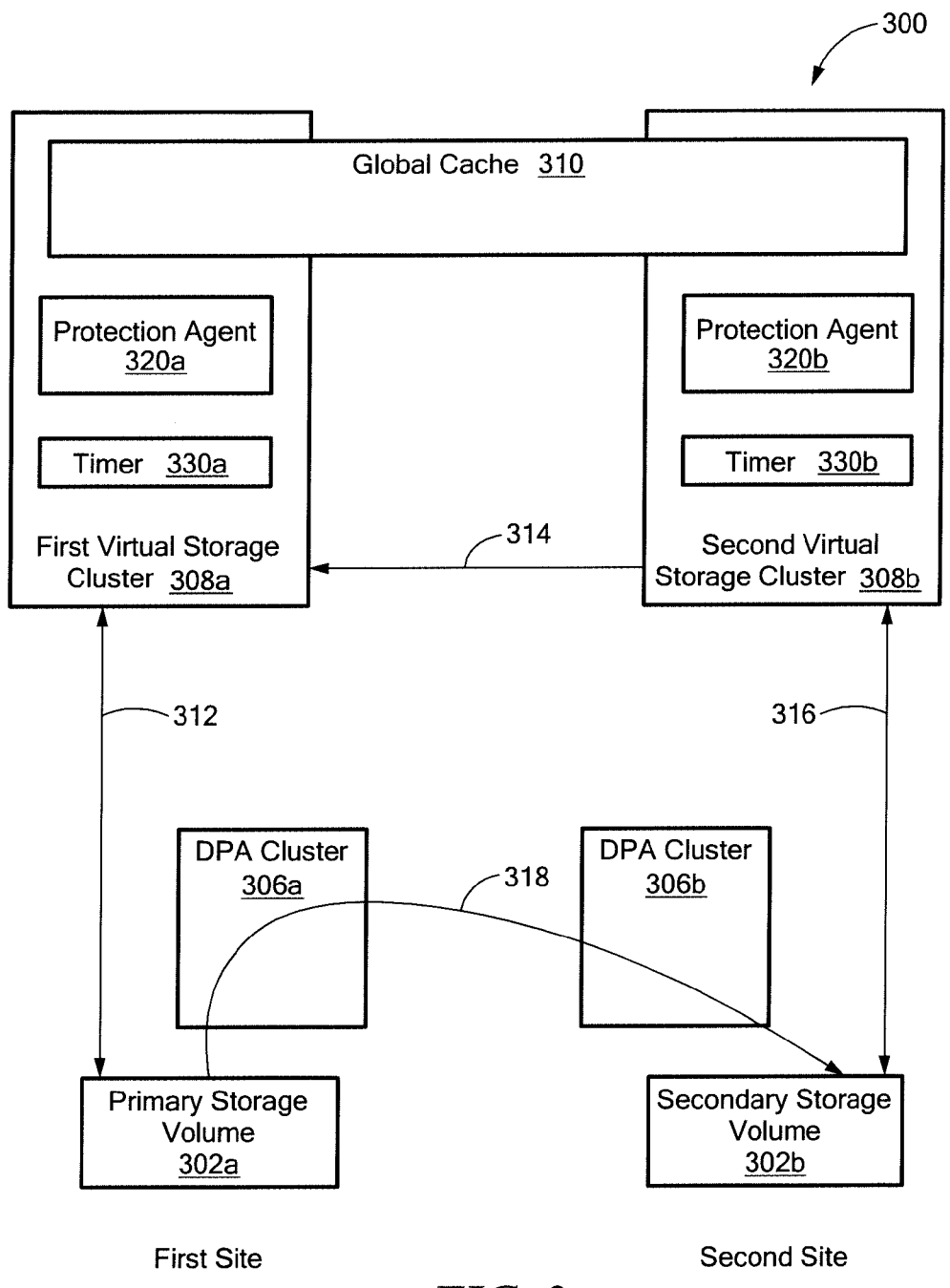
FIG. 3 is a block diagram of an example of a replication system that includes storage virtualization and provides asymmetric active-active access of asynchronously-protected data storage.

Referring to FIG. 3, an example of a replication system that includes asymmetric active-active access of asynchronously-protected storage is a system 300. However, it is important to note that any asynchronous replication may be suitable for the process of allowing asymmetric global cache and any continuous asynchronous replication may be suitable for failover. In the examples used herein DPA appliances are used, however the process may be performed by having appliance functionality performing at a virtual storage cluster.

The system 300 includes a primary storage volume 302a at a first site (production site) and a secondary storage volume 302b at a second site (replication site). The system 300 also includes a DPA cluster 306a at the first site, a DPA cluster 306b at the second site, a first virtual storage cluster 308a, a second virtual storage cluster 308b and a global cache 310. In one example, the primary storage volume 302a may be replaced with a consistency group across multiple storage volumes. In one example, the secondary storage volume 302b may be replaced with multiple storage volumes.

The first virtual storage cluster 308a includes a protection agent 320a and a timer 330a. The second virtual storage cluster 308b includes a protection agent 320b and a timer 330b. The first and second virtual storage cluster 308a, 308b are referred to herein as global cache processing nodes.

The primary storage volume 302a is asynchronously replicated to the secondary storage volume 302b using the connection 318 and using the DPA clusters 306a, 306b. Each of the primary and secondary storage volumes is virtually realized using virtual storage volumes (e.g., the first virtual storage cluster 308a and the second virtual storage cluster 308b respectively). The global cache 310 provides asymmetric active-active access to the primary storage volume 302a.

Hosts (not shown) at the first and the second site are given access to the primary storage volume 302a through the global cache 310. DPA cluster 306a and DPA cluster 306b are part of a replication layer.

The global cache 310 is a cache layer which manages a coherent cache between the two sites (e.g., the first and the second sites) allowing reads to be local at a remote site when possible.

The global cache exposes one virtual volume at both sites with the same identity i.e. on both sites the primary and secondary storage volumes 302a, 302b appear as the same SCSI entities to a host accessing the storage at both sites since the volumes 302a, 302b are not fully synchronized (i.e., primary storage volumes 302a is kept more updated, and not all reads can be redirected at secondary storage volume 302a).

The first virtual storage cluster 308a performs synchronous reads and writes to the primary storage volume 302a using the connection 312. The write operations to the primary storage volume 302a is a local operation for the first virtual storage cluster 308a and a higher latency remote operation from the second virtual storage cluster 308b, which uses a proxy for the write through the first virtual storage cluster 308a. It is this imbalance that makes the active-active access asymmetric.

The second virtual storage cluster 308b can synchronously write to the first virtual storage cluster 308a using the connection 314. While the reads from the primary storage volume are synchronous, the second virtual storage cluster 308b can provide local performance (at the second site) by reading from the secondary storage volume 302b using the connection 316. This local-read optimization is available only for regions on the secondary storage volume 302b for which there has not been a recent write. The secondary storage volume 302b typically lags behind the primary storage volume 302a because the replication stream is asynchronous. The data that the secondary storage volume 302b lacks to mirror the primary storage volume 302a is called herein lagging data. As will be further described herein, to correctly determine which blocks are safe to read from the secondary storage volume, the global cache 310 is used to coordinate with a replication stream.

The DPA cluster 306b at the second site writes replicated data to the secondary storage volume 302b through a volume exposed by the second virtual storage cluster 308b, but I/Os arriving though the DPA cluster 306b flow directly to the secondary storage volume 302b, (and do not go back to the first site through connection 314). The secondary virtual storage cluster 308b identifies I/Os arriving from DPA as special I/Os either by identifying the initiator as a special DPA initiator, or by exposing a volume with a different SCSI identity to the DPA and having the DPA write through the different volume.

Write I/Os may be generated by host(s) at the second site. The I/O flows to the first site is then intercepted by the protection agent 320a and split with the I/O data being stored at the primary storage volume 302a replicated back to the second site to the secondary storage volume 302b. In one example, a possible optimization can be to avoid sending the replicated I/O data from the first site back to the second site by keeping the data of the I/O at the second site in a memory and just sending metadata from the first site to the second site. The I/O data and the metadata are added to the second storage volume if the metadata is received form the first site.

Figure 4A:
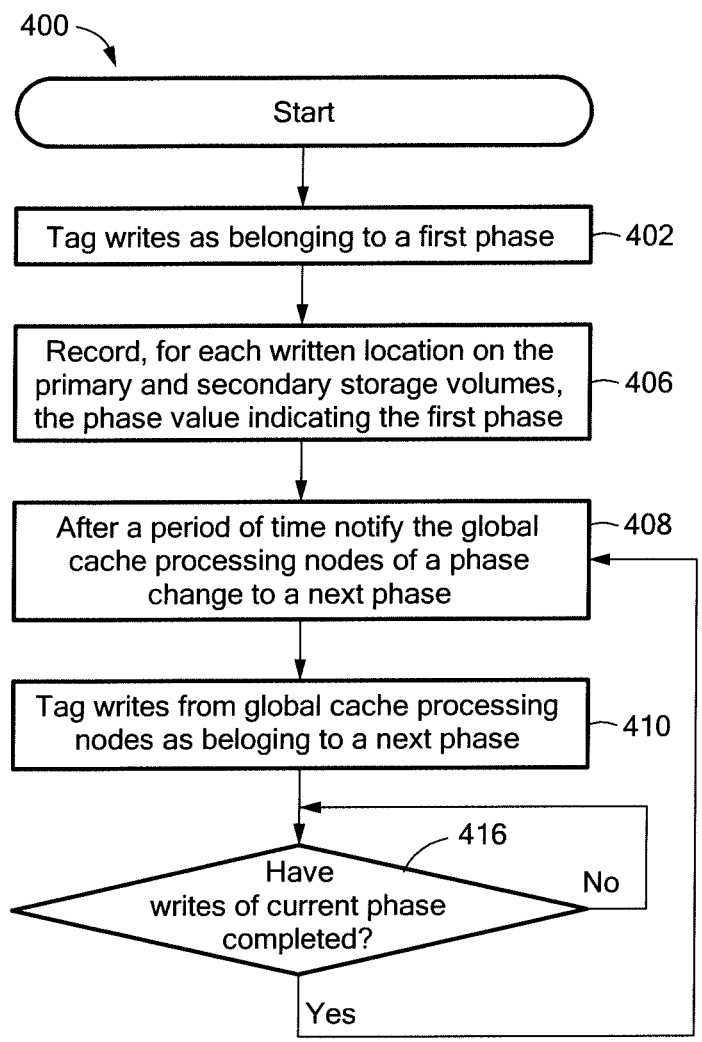
FIGS. 4A and 4B are flowcharts of an example of a process to account for a lag in a replication system having an asymmetric active-active access of asynchronously-protected data storage.
Figure 4B:
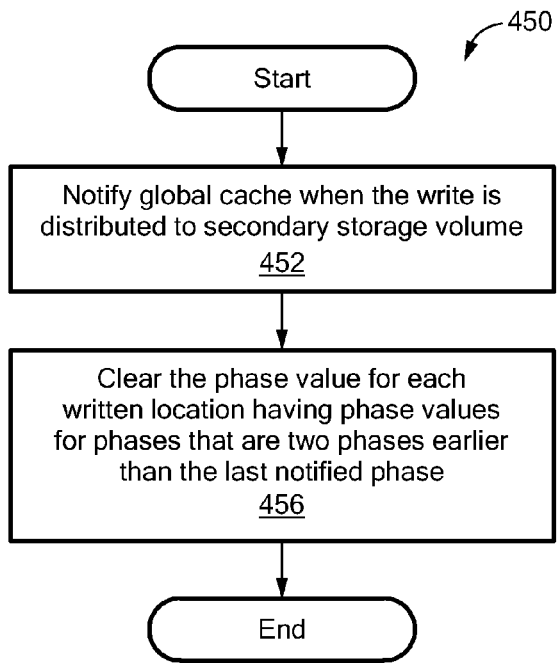

FIGS. 4A and 4B are an example of a process to account for a lag in updating a secondary storage volume in a replication system having an asymmetric active-active access of an asynchronously-protected data storage by tagging writes with a phase value. An example of a process to tag writes with a phase value is a process 400.

Process 400 tags writes as belonging to a first phase (402). For example, writes from the global cache processing nodes are tagged with a first phase value indicating a first phase. In one particular example, the first phase is a phase n. In one example, writes may be tagged either by (1) adding a tag in some bits of the CDB (SCSI Command Descriptor Block, i.e. the metadata of the SCSI command) of the writes when the writes are sent to a DPA or (2) tags may be sent in parallel to the I/Os either through an SCSI or any other protocol, but in a manner that tags can be synchronized with the I/Os. One example is sending a new tag when I/Os are quiesced (i.e., I/Os are held in the storage processor and not acknowledged to the host while phase change occurs). Other protocols may require no quiescing.

Process 400 records, for each location written to on the primary storage volume and the secondary volume during the phase, the phase value (406). For example, the global cache 310 records, for each written location on the primary storage volume 302a and the secondary storage volume 302b, the phase value indicating the first phase. In one example, the written location is recorded using metadata.

After a period of time, process 400 notifies the global cache processing nodes of a phase change to a next phase (408). For example, the global cache 310 notifies the protection agent 320a of the phase change and protection agent 320a starts sending commands with the new phase in the metadata. In one particular example, the global cache 310 initiates a phase change periodically. In one example, the next phase is n+1.

Process 400 tags writes from the global cache processing nodes as belonging to the next phase (410). For example, the writes arrive from the protection agent 320a to the DPA cluster 306a and then sent to the DPA cluster 306b are tagged as belonging to a n+1 phase. Even though a phase change is initiated the previous phase change is not complete until all writes belonging to the previous phase have completed, which means that the writes from two phases may be active concurrently (i.e., writes for each phase have not completed). For example, writes from a phase n and a phase n+1 may be active concurrently.

Process 400 determines if writes from a current phase are completed (416). If writes from a current phase are completed, process 400 proceeds to repeat processing block 408 for the next phase. For example, the next phase is n+2 phase. Note that now that phase n is closed the only active phase is phase n+1. After a period of time process 400 notifies the global cache processing nodes of a phase change to the next phase (408). For example, the protection agent 320a is notified that the next phase is n+2.

An example of a process to process writes with tags is a process 450. Process 450 notifies the global cache after a write arrives at the second site and is distributed to the secondary storage volume (452). The replication layer (e.g., DPA clusters 306a, 306b) transfers writes in order to the second site. As the first write from a phase arrives at the second site and is distributed to the secondary storage volume 302b, the replication layer (e.g., DPA clusters 306a, 306b), notifies the global cache 310.

Process 450 clear the phase value that has been recorded for each written location for phases that are two earlier than the phase being notified about (456). In one example, the global cache 310 clears the phase value that had been recorded for each written location in processing block 406 for phases that are two earlier than the phase being notified about. Thus if the notification is received that phase n+2 has started being distributed to secondary storage, the metadata can be cleared for written locations that were last written in phase n.

When the DPA cluster 306b starts applying I/O requests from the newest phase to the secondary storage volume 302b, the DPA cluster 306b notifies the global cache 310. The notification is done either by a control path command or by adding the phase in the CDB of the write command.

When the Cache layer at the replica site accepts POs with phase n+2 it can safely assume that all IOs of phases n and before are already flushed to the second site (replication site). And thus reads to locations for which the phase is n or lower can be served locally from the replica site.

When a read arrives at the second site a cache coherency layer (e.g. the global cache) checks whether it has any recorded phase value as might have been stored in 406, as this indicates that the data on the secondary storage volume is potentially older than the data on the primary storage volume (and the difference is still actively part of the replication stream). If so the read must be retrieved remotely from the primary site. If instead the global cache has no recorded phase value for the read location, that guarantees that the secondary storage volume contains the same data for this location as the primary storage volume, and the read data can come from the local secondary storage volume.

Figure 4C:
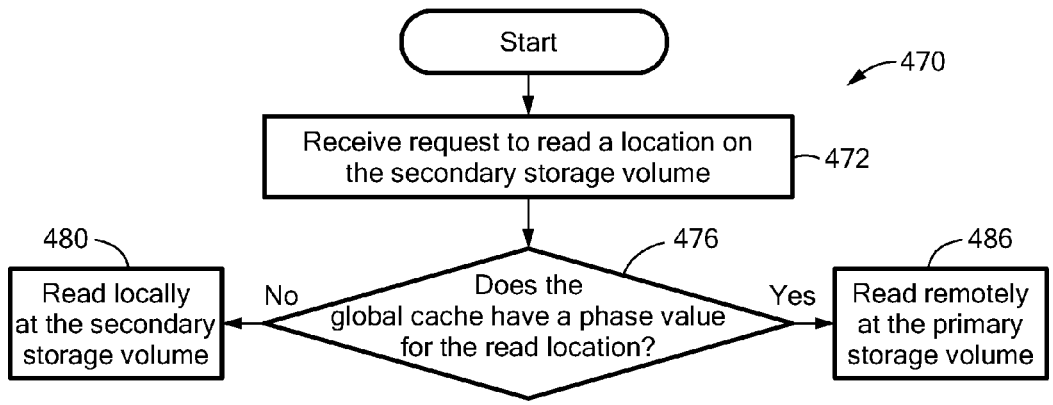
FIG. 4C is a flowchart of an example of a process to determine whether a replicated storage may be read.

Referring to FIG. 4C, an example of a process to determine if a replicated storage volume can be read is a process 470. Process 470 receives a request to read a location on the secondary storage volume 302b (472) and determines if the global cache 310 has a phase value for the read location (476). Process 470 reads the location at the second storage volume 302b if the global cache does not have a phase value for the location (480). Process 470 reads the location at the first storage volume 302a if the global cache 310 has a phase value for the location (486).

For example, when the global cache 310 is notified that phase n+2 has started to be distributed to the secondary storage volume 302b, the global cache 310 recognizes that all writes from phase n and earlier must have completed distribution; however, there may still be writes from phase n+1 to come. Thus, the global cache 310 can mark the locations that have not been changed since phase n as mirrored locations, and allow future reads to those mirrored locations from the second virtual storage cluster 308b to be read from the secondary storage volume 302b. The global cache 310 ensures that writes to the primary storage volume 302a that follow reads configured to use the secondary storage volume 302b will wait for the earlier reads to be completed before being submitted to the storage or replication layers. Any write will access the metadata to determine whether the global cache 310 contains any data that will become stale because of this write. The write is handled at the storage cluster and when the storage node gets the write it accesses the metadata in the cache. This will include the data being read into cache from the secondary storage volume. The write invalidates the stale data to remove it from the cache, and will send an invalidation request to the reading node. The reading node will queue the invalidation request until the read completes.

Figure 5:
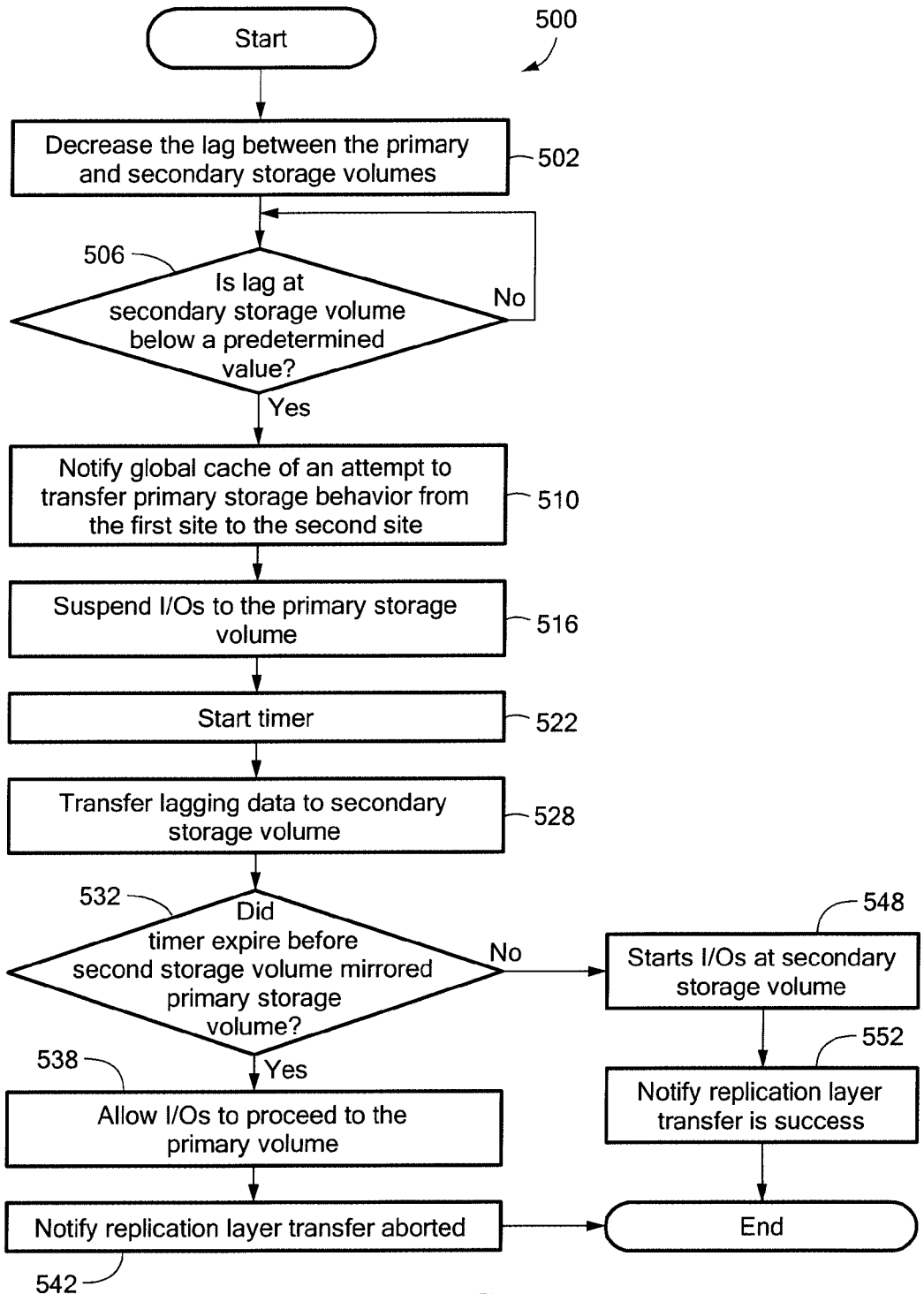
FIG. 5 is a flowchart of an example of a process to transfer primary storage functionality from one site to another site.

Referring to FIG. 5, because the behavior of the system is asymmetric, in some cases there may be a desire to perform a failover, and transfer the primary site to the replica site. An example of a process to transfer primary storage functionality from one site to another site is a process 600. For example, process 500 is used to transfer the primary storage functionality from the first site to the second site (FIG. 3).

Process 500 decreases the lag between the primary and secondary storage volumes (502). For example, a replication layer (e.g., DPA clusters 306a, 306b) increases the replication rate, or decrease the incoming throughput of I/O requests to the first site by delaying acknowledgments to the writing hosts (not shown).

Process 500 determines if the lag of the secondary storage volume 302b at the secondary site is below a predetermined threshold (506). For example, the replication layer (e.g., DPA clusters 306a, 306b) determines if the lag of the secondary storage volume 302b is below a predetermined threshold. For example, the lag is smaller than 100 MB.

Process 500 notifies the global cache that an attempt can be made to transfer of primary storage functionality from the first site to the second site may be made (510). For example, the replication layer (e.g., DPA clusters 306a, 306b) notifies the global cache 310 of the transfer.

Process 500 suspends I/Os to the primary storage volume (516) and starts a timer (522). For example, the global cache 310 suspends the I/Os (i.e., write I/Os and read I/Os) to the primary storage volume 302a and starts the timer 330a in the storage cluster 308a. In one example, the timer 330a is a countdown timer of a length short enough to avoid an impact with an application using the primary storage volume 302a.

Process 500 transfers the lagging data to the secondary storage volume (528). For example, the replication layer transfers the lagging data to the secondary storage volume 302b in attempt to have the secondary storage volume 302b mirror the primary storage volume 302a prior to the timer expiring.

Process 500 determines if the timer expires before the primary storage volume and the second storage volume are mirrored (532). If the timer expires before the primary storage volume and the second storage volume are mirrored, process 500 allow I/Os to proceed to the primary storage volume (538) and notifies the replication layer that the transfer was aborted (542). For example, the global cache 310 allows the POs to proceed to the primary storage volume 302a and notifies the DPA clusters 306a, 306b that the transfer from the first site to the second site was aborted.

If the timer does not expire before the primary storage volume and the second storage volume are mirrored, process 500 starts I/Os at the secondary storage volume (548) and notifies the replication layer that the transfer was a success (542). For example, the global cache 310 allows the I/O requests to start at the secondary storage volume 302b and notifies the DPA clusters 306a, 306b that the transfer from the first site to the second site was a success.

The replication direction may now be reversed and replication is started from the second site and copied to the first site.

Referring to FIG. 6, an example of a process to automatically (without user intervention) transfer primary storage functionality from one site to another site is a process 600. For example, process 500 is used to automatically transfer the primary storage functionality from the first site to the second site (FIG. 3).

Process 600 detects writes from the first site and from the second site (602).

Process 600 determines if the second site with the secondary storage volume is providing more than a predetermined amount of writes than the first site with the primary storage volume 302a (606).

If the second site is providing more than a predetermined amount of writes than the first site, process 600 performs the process 500 (FIG. 5) and transfers the primary storage functionality to the second site with the second storage volume 302b (620). Thus, the secondary storage volume 302b becomes the primary storage volume and the first storage volume 302a becomes the secondary storage volume.

After process 500 is completed, process 600 returns to processing block 602.

It would be understood by one of ordinary skill in the art that instead of measuring the amount of writes the site with secondary storage volume provides more than the site with primary storage volume provides, a ratio between the writes provided at the site with secondary storage volume to writes provided at the site with primary storage volume may be measured and a ratio that exceeds a predetermined value would trigger execution of the process 500.

Referring to FIG. 7, in one example, a computer 700 includes a processor 702, a volatile memory 704, a non-volatile memory 706 (e.g., hard disk) and the user interface (UI) 708 (e.g., a graphical user interface, a mouse, a keyboard, a display, touch screen and so forth). The non-volatile memory 706 stores computer instructions 712, an operating system 716 and data 718. In one example, the computer instructions 712 are executed by the processor 702 out of volatile memory 704 to perform all or part of the processes described herein (e.g., processes 400, 450, 470, 500 and 600).

The processes described herein (e.g., processes 400, 450, 470, 500 and 600) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 400, 450, 470, 500 and 600 are not limited to the specific processing order of FIGS. 4A to 4C, 5 and 6, respectively. Rather, any of the processing blocks of FIGS. 4A to 4C, 5 and 6 may be re-ordered, combined or removed, performed in parallel or in serial, as necessary, to achieve the results set forth above.

The processing blocks (for example, in the processes 400, 450, 470, 500 and 600) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method, comprising:
 providing asymmetric active-active access to a first storage volume using a global cache coupled to a first and second virtual storage volumes, the first virtual storage volume comprising a first timer and a first protection agent, comprising:
  replicating asynchronously the first storage volume at a first site to a second storage volume at a second site, the first storage volume having primary storage functionality;
  virtualizing the first storage volume with the first virtual storage volume at the first site;
  virtualizing the second storage volume with the second virtual storage volume at the second site;
  establishing the global cache as a cache layer that manages a coherent cache between the first virtual storage volume and the second virtual storage volume, wherein the first and second virtual storage volumes are processing nodes of the global cache;
  enabling access of the first storage volume, through the global cache, by a first host at the first site and a second host at the second site;
  exposing, by the global cache, the first virtual storage volume and the second virtual storage volume as the same volume having the same identity to the first host and the second host;
  accounting for a lag in updating the secondary storage volume by tagging write commands with a phase value using the first protection agent;
  notifying the first protection agent by the global cache of changes to the phase value; and
  in response to write input/output (I/O) requests, sending the phase value data in metadata of write commands issued by the first protection agent.

2. The method of claim 1, further comprising:
 receiving a request to read a location on the first storage volume at the second site;
 reading the location at the first storage volume if the global cache has the phase value for the location; and reading the location at the second storage volume if the global cache does not have a phase value for the location.

3. The method of claim 2, further comprising tracking locations in the secondary storage volume that do not mirror the first storage volume, the tracking comprising:
for every write I/O request, tracking a phase for each location on the first storage volume and the second storage volume;
periodically changing the phase.

4. The method of claim 3, wherein tracking the locations further comprises:
notifying the global cache of the last applied phase for each location; and
clearing phase values for all locations at the second storage volume more than one phase old.

5. The method of claim 1, further comprising transferring the primary storage functionality from the first site to the second site, the transferring comprising:
notifying the global cache of an attempt to transfer primary storage functionality from the first site to the second site;
suspending I/O requests to the first storage volume;
transferring lagging data to the second storage volume; and
starting I/O requests at the second storage volume as having primary storage functionality if the secondary storage volume mirrors the first storage volume before a predetermined amount of time elapses.

6. The method of claim 5, wherein transferring the primary storage functionality further comprises allowing I/O requests to proceed to the first storage volume if the secondary storage volume does not mirror the first storage volume before a predetermined amount of time elapses.

7. The method of claim 5, wherein transferring the primary storage functionality further comprises decreasing an amount of lagging data.

8. The method of claim 5, wherein transferring the primary storage functionality further comprises:
determining an amount of I/O requests provided at the first site;
determining an amount of I/O requests provided at the second site; and
determining if the number of I/O requests provided by the second site is more than the number of I/O requests provided by the first site a predetermined value; and
performing the transferring of primary storage functionality from the first storage volume to the second storage volume if the number of I/O requests provided by the second site is more than the number of I/O requests provided by the first site by a predetermined number.

9. The method of claim 1, further comprising:
receiving a local write I/O request from a host at the second site;
storing data of the local write I/O request in a memory at the second site; and
storing the data of the local write I/O request in the second storage volume from the memory if metadata arrives at the second site for replication from the first site.

10. An apparatus, comprising:
electronic hardware circuitry to provide asymmetric active-active access to a first storage volume using a global cache coupled to a first and second virtual storage volumes, the first virtual storage volume comprising a first timer and a first protection agent, the circuitry configured to:
replicate asynchronously the first storage volume at a first site to a second storage volume at a second site, the first storage volume having primary storage functionality;
virtualize the first storage volume with the first virtual storage volume at the first site;
virtualize the second storage volume with the second virtual storage volume at the second site;
establish the global cache as a cache layer that manages a coherent cache between the first virtual storage volume and the second virtual storage volume, wherein the first and second virtual storage volumes are processing nodes of the global cache;
enable access of the first storage volume, through the global cache, by a first host at the first site and a second host at the second site; and
expose, by the global cache, of the first virtual storage volume and the virtual second storage volume as the same volume having the same identity to the first host and the second host;
account for a lag in updating the secondary storage volume by tagging write commands with a phase value using the first protection agent;
notify the first protection agent by the global cache of changes to the phase value; and
in response to write input/output (I/O) requests, send the phase value data in metadata of commands issued by the first protection agent.

11. The apparatus of claim 10 wherein the circuitry comprises at least one of a processor, a memory, a programmable logic device or a logic gate.

12. The apparatus of claim 10, further comprising circuitry configured to:
receive a request to read a location on the first storage volume at the second site;
read the location at the first storage volume if the global cache has the phase value for the location; and
read the location at the second storage volume if the global cache does not have a phase value for the location.

13. The apparatus of claim 12, further comprising circuitry configured to track locations in the secondary storage volume that do not mirror the first storage volume,
the circuitry configured to track comprising circuitry configured to:
for every write I/O request, track a phase for each location on the first storage volume and the second storage volume;
periodically change the phase.

14. The apparatus of claim 13, wherein the circuitry configured to track the locations further comprises circuitry configured to:
notify the global cache of the last applied phase for each location; and
clear phase values for all locations at the second storage volume more than one phase old.

15. The apparatus of claim 10, further comprising circuitry configured to transfer the primary storage functionality from the first site to the second site, the circuitry configured to transfer comprising circuitry configured to:
notify the global cache of an attempt to transfer primary storage functionality from the first site to the second site;
suspend I/O requests to the first storage volume;
transfer lagging data to the second storage volume; and
start I/O requests at the second storage volume as having primary storage functionality if the secondary storage volume mirrors the first storage volume before a predetermined amount of time elapses.

16. The apparatus of claim 15, wherein the circuitry configured to transfer the primary storage functionality further comprises circuitry configured to allow I/O requests to proceed to the first storage volume if the secondary storage volume does not mirror the first storage volume before a predetermined amount of time elapses.

17. The apparatus of claim 15, wherein the circuitry configured to transfer the primary storage functionality further comprises circuitry configured to decrease an amount of lagging data.

18. The apparatus of claim 15, wherein the circuitry configured to transfer the primary storage functionality further comprises circuitry configured to:
   determine an amount of I/O requests provided at the first site;
   determine an amount of I/O requests provided at the second site; and
   determine if the number of I/O requests provided by the second site is more than the number of I/O requests provided by the first site a predetermined value; and
   perform the transferring of primary storage functionality from the first storage volume to the second storage volume if the number of I/O requests provided by the second site is more than the number of I/O requests provided by the first site by a predetermined number.

19. The apparatus of claim 10, further comprising circuitry configured to:
   receive a local write I/O request from a host at the second site;
   store data of the local write I/O request in a memory at the second site; and
   store the data of the local write I/O request in the second storage volume from the memory if metadata arrives at the second site for replication from the first site.

20. An article comprising:
   a non-transitory computer-readable medium that stores computer-executable instructions to provide asymmetric active-active access to a first storage volume using a global cache coupled to a first and second virtual storage volumes, the first virtual storage volume comprising a first timer and a first protection agent, the instructions causing a machine to:
      replicate asynchronously the first storage volume at a first site to a second storage volume at a second site, the first storage volume having primary storage functionality;
      virtualize the first storage volume with the first virtual storage volume at the first site;
      virtualize the second storage volume with the second virtual storage volume at the second site;
      establish the global cache as a cache layer that manages a coherent cache between the first virtual storage volume and the second virtual storage volume, wherein the first and second virtual storage volumes are processing nodes of the global cache;
      enable access of the first storage volume, through the global cache, by a first host at the first site and a second host at the second site; and
      expose, by the global cache, the first virtual storage volume and the second virtual storage volume as the same volume having the same identity to the first host and the second host;
      account for a lag in updating the secondary storage volume by tagging write commands with a phase value using the first protection agent;
      notify the first protection agent by the global cache of changes to the phase value; and
      in response to write input/output (I/O) requests, send the phase value data in metadata of commands issued by the first protection agent.

21. The article of claim 20, further comprising instructions causing the machine to:
   receive a request to read a location on the first storage volume at the second site;
   read the location at the first storage volume if the global cache has the phase value for the location; and
   read the location at the second storage volume if the global cache does not have a phase value for the location.

22. The article of claim 21, further comprising instructions causing the machine to track locations in the secondary storage volume that do not mirror the first storage volume,
   the instructions causing the machine to track comprising instructions causing the machine to:
      for every write I/O request, track a phase for each location on the first storage volume and the second storage volume;
      periodically change the phase.

23. The article of claim 22, wherein the instructions causing the machine to track the locations further comprises instructions causing the machine to:
   notify the global cache of the last applied phase for each location; and
   clear phase values for all locations at the second storage volume more than one phase old.

24. The article of claim 20, further comprising instructions causing the machine to transfer the primary storage functionality from the first site to the second site, the instructions causing the machine to transfer comprising instructions causing the machine to:
   notify the global cache of an attempt to transfer primary storage functionality from the first site to the second site;
   suspend I/O requests to the first storage volume;
   transfer lagging data to the second storage volume; and
   start I/O requests at the second storage volume as having primary storage functionality if the secondary storage volume mirrors the first storage volume before a predetermined amount of time elapses.

25. The article of claim 24, wherein the instructions causing the machine to transfer the primary storage functionality further comprises instructions causing the machine to allow I/O requests to proceed to the first storage volume if the secondary storage volume does not mirror the first storage volume before a predetermined amount of time elapses.

26. The article of claim 24, wherein the instructions causing the machine to transfer the primary storage functionality further comprises instructions causing the machine to decrease an amount of lagging data.

27. The article of claim 24, wherein the instructions causing the machine to transfer the primary storage functionality further comprises instructions causing the machine to:
   determine an amount of I/O requests provided at the first site;
   determine an amount of I/O requests provided at the second site; and
   determine if the number of I/O requests provided by the second site is more than the number of I/O requests provided by the first site a predetermined value; and
   perform the transferring of primary storage functionality from the first storage volume to the second storage volume if the number of I/O requests provided by the second site is more than the number of I/O requests provided by the first site by a predetermined number.

28. The article of claim 20, further comprising instructions causing the machine to:
   receive a local write I/O request from a host at the second site;

store data of the local write I/O request in a memory at the second site; and store the data of the local write I/O request in the second storage volume from the memory if metadata arrives at the second site for replication from the first site.

* * * * *